US012638273B2

(12) United States Patent
Ferman

(10) Patent No.: US 12,638,273 B2
(45) Date of Patent: May 26, 2026

(54) SKIN MARKING SOLUTION AND METHOD OF USE

(71) Applicant: Randall Ferman, Randolph, NJ (US)

(72) Inventor: Randall Ferman, Randolph, NJ (US)

( * ) Notice: Subject to any disclaimer, the term of this patent is extended or adjusted under 35 U.S.C. 154(b) by 972 days.

(21) Appl. No.: 16/388,131

(22) Filed: Apr. 18, 2019

(65) Prior Publication Data

US 2020/0333114 A1     Oct. 22, 2020

(51) Int. Cl.
| | |
|---|---|
| *F41H 3/02* | (2006.01) |
| *A61Q 1/02* | (2006.01) |
| *B05D 1/28* | (2006.01) |
| *C09D 5/20* | (2006.01) |
| *C09D 5/30* | (2006.01) |
| *D06P 1/00* | (2006.01) |
| *F41H 3/00* | (2006.01) |

(52) U.S. Cl.
CPC .................. *F41H 3/02* (2013.01); *A61Q 1/02* (2013.01); *B05D 1/28* (2013.01); *C09D 5/20* (2013.01); *C09D 5/30* (2013.01); *F41H 3/00* (2013.01)

(58) Field of Classification Search
CPC ... A61K 8/04; A61K 8/34; A61K 8/73; A61K 8/8147; A61K 8/345; A61Q 1/02; B05D 1/28; C09D 5/20; C09D 5/30; D06P 1/004; F41H 3/00; F41H 3/02
See application file for complete search history.

(56) References Cited

U.S. PATENT DOCUMENTS

| | | | | | |
|---|---|---|---|---|---|
| 5,087,446 | A | * | 2/1992 | Suzuki ................... | A61K 8/735 514/777 |
| 5,229,121 | A | * | 7/1993 | Razzano .............. | A61K 8/0212 132/200 |
| 2005/0163741 | A1* | | 7/2005 | Zech ...................... | A61Q 1/025 424/70.17 |
| 2006/0260633 | A1* | | 11/2006 | Wyatt .................... | A46B 9/021 132/218 |
| 2007/0148111 | A1* | | 6/2007 | Simpson ................ | A61K 8/342 424/70.13 |

OTHER PUBLICATIONS

Donahue: How to Apply (and Remove) Halloween Face Paint Like a Pro, https://www.allure.com/story/how-to-remove-halloween-face-paint (Year: 2017).*
Bobby Weiner camo face paint: https://www.amazon.com/Bobby-Weiner-Camo-Face-Paint/dp/B07DX8VMWY?th=1 (Year: 2003).*
Speed Camo Tri-color Makeup Sticks: https://www.ebay.com/p/1403932244 (Year: 2017).*

* cited by examiner

*Primary Examiner* — Hong Yu
(74) *Attorney, Agent, or Firm* — Foley & Lardner LLP

(57) ABSTRACT

A method of applying camouflage solution for outdoor use comprising gathering a globule of camouflage solution, pressing the globule of camouflage solution onto a surface of a body, spreading the globule of camouflage on the surface, waiting a period of time for the camouflage solution to change from a liquid state to a solid state, and removing the camouflage solution from the surface.

14 Claims, 4 Drawing Sheets

400

410

100

110

120

130

140

130

111

120

140

110

111

113

115

114

112

200
211
210
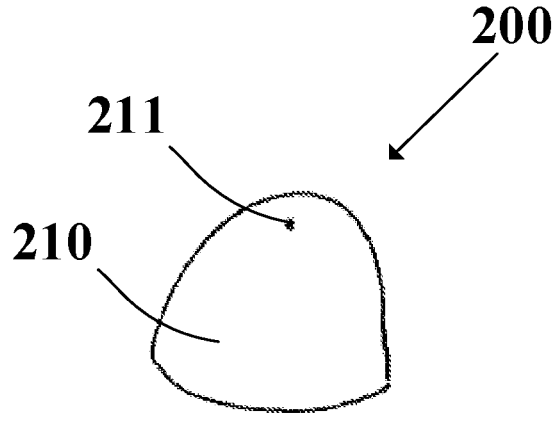
Fig. 2
300
310
400
410
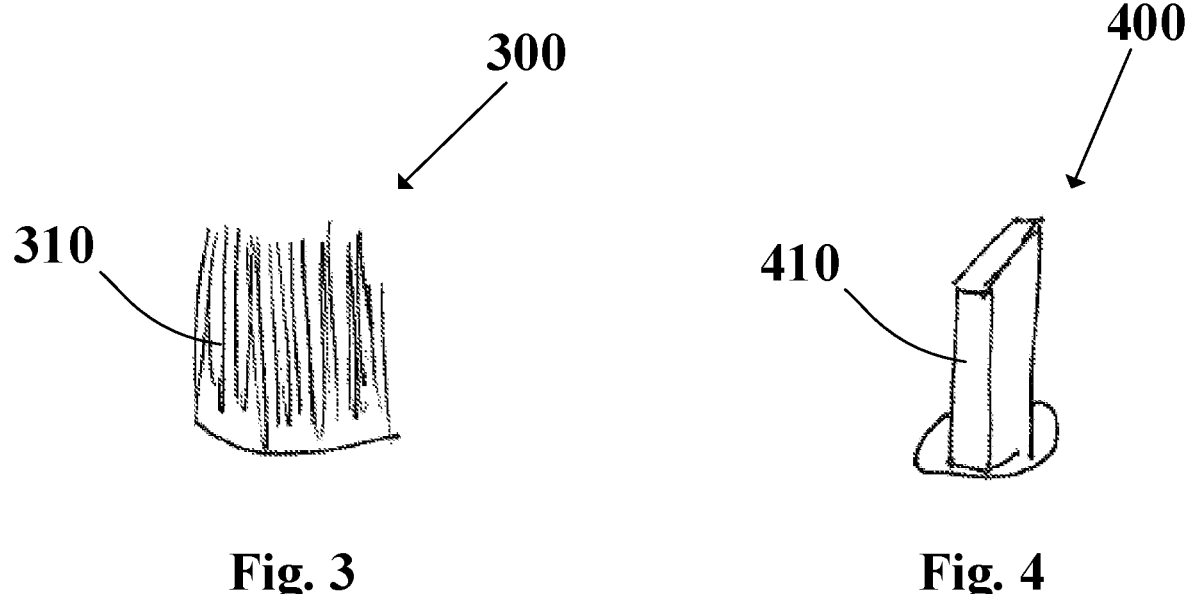
Fig. 3                    Fig. 4

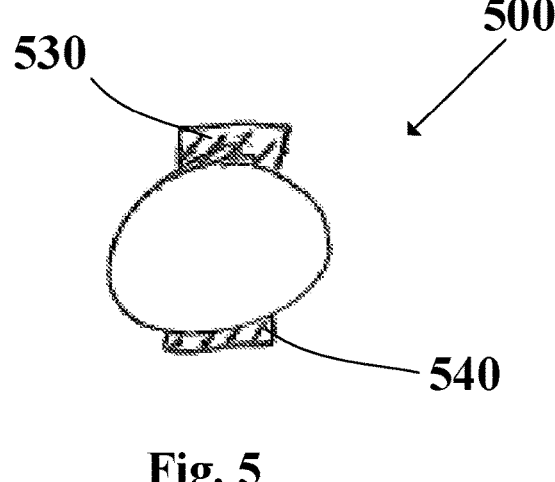
Fig. 5
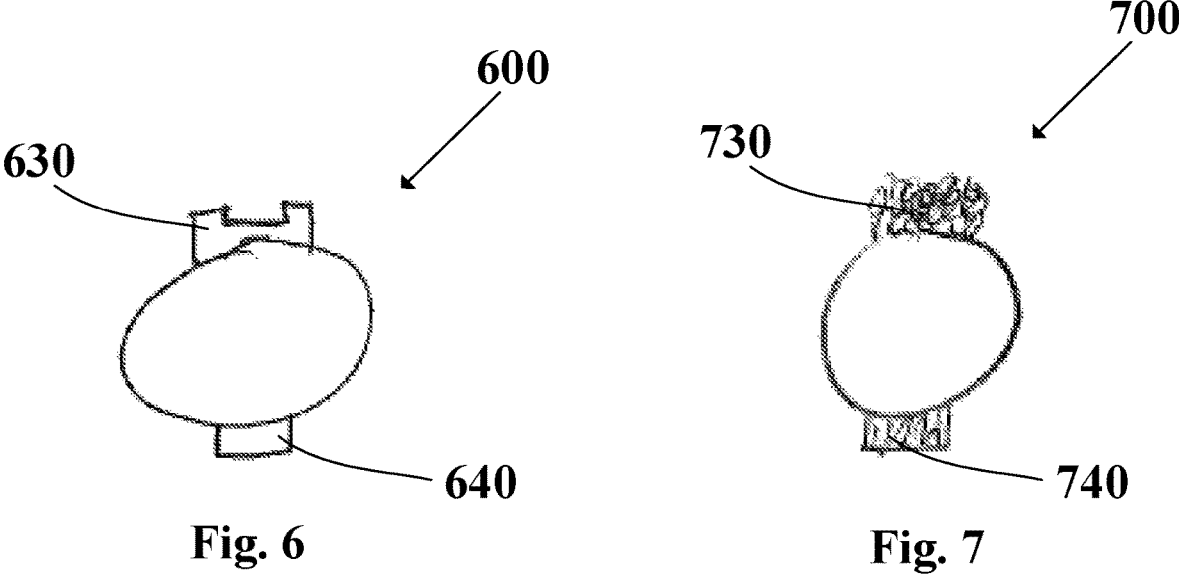
Fig. 6     Fig. 7

SKIN MARKING SOLUTION AND METHOD OF USE

BACKGROUND OF THE INVENTION

Camouflage is used in a variety of applications for the purposes of concealment, including, for instance, during military operations and hunting. When it comes to visual camouflage on a person, a combination of materials and color(s) are used to make the person more difficult to locate. For instance, they may attempt to blend in with the background, eliminate shadows, incorporate countershading, and/or use disruptive coloration.

When using camouflage, a person must ensure that their entire visual appearance, including their clothes and exposed parts of the housing, serve the goal of concealment. While there are camouflaged articles of clothing available, the same cannot be said of a person's natural skin tone. Thus, camouflaging a body part usually necessitates the application of camouflage paint. However, camouflage paint is usually difficult to remove. Due to the nature of use of camouflage, camouflage paint is designed to be sweat- and water-resistant. Further, camouflage paint is designed to withstand physical contact from a variety of sources (e.g. environmental, or the like). For instance, if a person is hunting, camouflage should be able to withstand contact from foliage or animals. During military use, camouflage should be able to withstand sand, snow, debris, and the like.

Additionally, a person may find themselves in a situation where a skin marking solution must be applied in a quick and efficient manner. For instance, when a user is out in inclement weather, there may be a need for a camouflage that can dry quickly despite less than ideal conditions. Further, the camouflage should be easy to apply by the user, particularly in situations where facilities are not available. Currently available products do not account for these situations. Further, this application might be required without the use of both hands, as one hand may be occupied by, for instance, a firearm, tool, or the like. In such instances, applying the skin marking solution with one hand is cumbersome, and applying the solution straight from the container may be inefficient or impossible due to the container's geometric design.

Likewise, currently available products are difficult to remove, often requiring copious amounts of water, or even a solvent such as a makeup remover, soap, or baby wipes. In situations where a person is using camouflage, water and/or solvents can be difficult to locate, or may be unavailable. Thus, a user may have to keep the same camouflage on for days on end.

Therefore, there is a need for both an applicator that reduces the difficulty in applying a skin marking solution, and for a skin marking solution that is easier to remove.

BRIEF SUMMARY OF THE INVENTION

The present disclosure is directed to a skin marking solution and methods of use, including with the use of an applicator. For example, the skin marking solution may be a camouflage solution used during hunting, which may be applied using a hand or an applicator.

In one embodiment, a camouflage solution includes a solvent, at least one alcohol, a lubricant, a buffering agent, a binder, a gelling agent, a coloring agent, and at least one preservative. Further, the at least one alcohol may be an alcohol mixture including SD-Alcohol 40-B, may be an isopropyl alcohol, polyvinyl alcohol, or a combination thereof. Further, the coloring agent may be a substantially black, green, tan, brown, whitening agent such as titanium dioxide, or a combination thereof. Further, the lubricant may be glycerol. Further, the buffering agent may be propanediol. Further, the binder may be pullulan. Further, the gelling agent may be carbomer. Further, the preservative may be phenoxyethanol, ethylhexylglycerin, or a combination thereof. Further, the solvent is water, the at least one alcohol may be an alcohol mixture including isopropyl alcohol and polyvinyl alcohol or an alcohol mixture including SD-Alcohol 40-B and polyvinyl alcohol, the lubricant may be glycerol, the buffering agent is propanediol, the binder may be pullulan, the gelling agent may be carbomer, and the preservative may be phenoxyethanol, ethylhexylglycerin, or a combination thereof. Further, the solvent may be water. Further, or in the alternative of one or more of the above components, the solution may include an inorganic pigment, such as titanium dioxide.

In another embodiment, a method of applying camouflage solution including gathering a globule of camouflage solution onto an applicator, pressing the globule of camouflage solution onto a surface of a body with the applicator pressing the globule of camouflage solution onto a surface of a body with the applicator, spreading the globule of camouflage on the surface, waiting a period of time for the camouflage solution to change from a liquid state to a solid state, and removing the camouflage solution from the surface. Further, the removing step may further include at least one of rolling, scraping, or peeling the camouflage solution from the surface. Further, the removing step may not include the use of water or solvent. Further, the removing step may not include the use of water or solvent removes substantially all of the camouflage solution from the surface. Further, the gathering step may further include attaching the applicator to at least one other applicator, each of the applicators gathering a respective globule of camouflage solution on a respective tip of the applicators.

In another embodiment, a method of applying camouflage solution for outdoor use comprising gathering a globule of camouflage solution, pressing the globule of camouflage solution onto a surface of a body, spreading the globule of camouflage on the surface, waiting a period of time for the camouflage solution to change from a liquid state to a solid state, and removing the camouflage solution from the surface. Further, the removing step may further comprise at least one of rolling, scraping, or peeling the camouflage solution from the surface. Further, the removing step may not include the use of water or solvent. Further, the removing step not including the use of water or solvent may remove substantially all of the camouflage solution from the surface. Further, the gathering step may further comprise gathering the globule on an applicator, the pressing step may further comprise pressing the globule with the applicator, and the spreading step may further comprise spreading the globule with the applicator. Further, the gathering step may further comprise attaching the applicator to at least one other applicator, each of the applicators gathering a respective globule of camouflage solution on a respective tip of the applicators. Further, the gathering step may further comprise gathering the globule on a user's hand, the pressing step may further comprise pressing the globule with the user's hand, and the spreading step may further comprise spreading the globule with the user's hand. Further, the outdoor use may include at least one of hunting, sports, recreational activities, or military use, or the like.

In another embodiment, the present disclosure includes a method of using camouflage solution comprising gathering a globule of camouflage solution onto an object, pressing the globule of camouflage solution onto a surface of a body with the object, spreading the globule of camouflage on the surface, waiting a period of time for the camouflage solution to change from a liquid state to a solid state, and removing the camouflage solution from the surface. Further, the removing step may further comprise at least one of rolling, scraping, or peeling the camouflage solution from the surface. Further, the removing step may not include the use of water or solvent. Further, the removing step not including the use of water or solvent may remove substantially all of the camouflage solution from the surface. Further, the object may be one of at least an applicator or a user's hand. Further, the gathering step may further comprise at least one of gathering the globule on a tip of the applicator or a finger of the user's hand.

In another embodiment, a system for applying camouflage solution including an applicator including a housing including a length between a first end and a second end and a width defined by a body of the housing extending from the first end to the second end, a volume at least partially defined by the first end, the second end, and the body, the volume configured to contain the camouflage solution, the first end having an opening configured to allow the camouflage solution to flow therethrough, at least a first connector and a second connector positioned on the body of the housing, each connector adapted to engage a first connector or a second connector of a second applicator, and a tip attached to the first end of the housing and having a passageway, the passageway being in fluid connection with the opening, and the camouflage solution including solvent, at least one alcohol, an emulsifying surfactant, a buffering agent, a binder, a gelling agent, a coloring agent, and at least one preservative. Further, the tip is one of an angled surface, a substantially round surface, a brush, or a felt tip. Further, the first connector may be at least one of a positive magnetic portion, a protruding portion, or a Velcro portion, and the second connector is at least one of a negative magnetic portion, a receiving portion sized to receive the protruding portion, or a fabric portion. Further, the solvent is water, the at least one alcohol may be SD-Alcohol 40-B and polyvinyl alcohol, the lubricant may be glycerol, the buffering agent may be propanediol, the binder may be pullulan, the gelling agent may be carbomer, and the preservative may be phenoxyethanol, ethylhexylglycerin, or a combination thereof. Further, the solvent may be water.

BRIEF DESCRIPTION OF THE DRAWINGS

FIG. 2 depicts a partial view of the tip of the applicator according to another embodiment of the invention.

FIG. 3 depicts a partial view of the tip of the applicator according to another embodiment of the invention.

FIG. 4 depicts a partial view of the tip of the applicator according to another embodiment of the invention.

FIG. 5 depicts a top view of the applicator according to another embodiment of the invention.

FIG. 6 depicts a top view of the applicator according to another embodiment of the invention.

FIG. 7 depicts a top view of the applicator according to another embodiment of the invention.

DETAILED DESCRIPTION

Figure 1A:
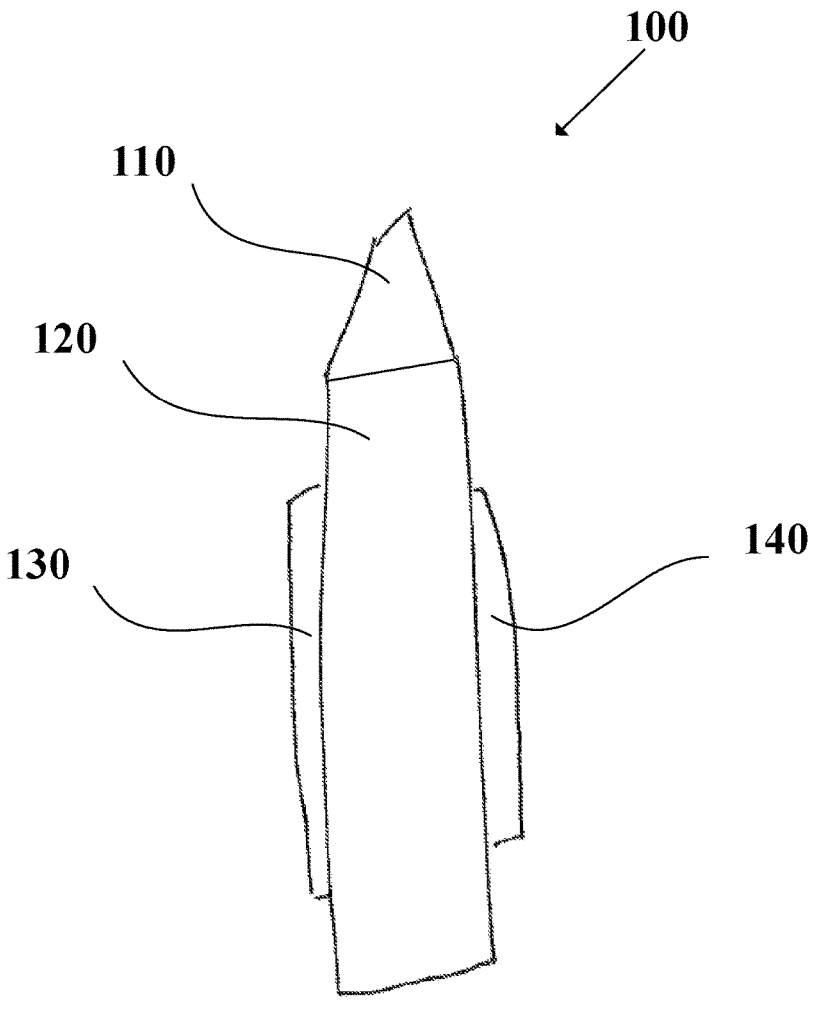
FIG. 1A depicts a side view of an applicator according to one embodiment of the present invention.

Generally, the present disclosure pertains to skin marking solutions and associated applications, whereby the applicators allow for easier application of the solution and the solutions themselves allow for easier application as well as easier removal after use. For example, the solution may initially be in a liquid form when being applied, but, upon a certain period of time passing, turn solid. In that solid form, the solution may be removed without the use of water or any kind of solvent, including any combination of solvents (e.g. soap and water, baby wipe solution, or the like). Instead, the solution may be removed simply by peeling, scraping, or rolling the solution, in its solid form, off of the surface to which it was applied. In certain embodiments, the present disclosure also includes an applicator for more efficient and customizable application of the solution. For instance, the applicator may include a tip designed to maximize the ease of use of applying the solution while also allowing for the simultaneous application of multiple colors.

Other than in the operating examples, or where otherwise indicated, all numbers expressing quantities of ingredients and/or ratios of ingredients are to be understood as being modified in all instances by the term "about."

The solution, compositions, and methods of the present invention can comprise, consist of, or consist essentially of the essential elements of the invention described herein, as well as any additional or optional ingredients or components described herein or any otherwise useful ingredients found in personal care compositions intended for application to keratinous materials.

The term "camouflage" as used herein refers to the combination of visual elements used to or intended to obscure a person or object from sight.

The term "solution" as used herein refers to the composition of chemicals that create the skin marking effect. The composition can be in a solid or liquid form of any viscosity, and may be applied onto a housing or an object. In particular, the composition may be applied in liquid form on a person or object, such as the skin of a person, and, after a period of time, be in a solid form, and further, the composition is easily removable, without the necessity of water, solvent or the like.

The term "skin mark" as used herein refers to the use of the solution on a user's, or another person's, skin (e.g. the face). Examples of "skin mark" may include camouflage, players or fans during sporting events, military use, and holiday (e.g. Halloween, or the like) use. A specific use of the solution of the present disclosure is as a camouflage solution. The solution of the present disclosure is particularly beneficial and useful as a camouflage solution for use in remote locations, as discussed in greater detail herein.

In one embodiment, the composition of the solution includes a solvent, at least one alcohol, an emulsifying surfactant, a buffering agent, an inorganic pigment, a coloring agent, and at least one preservative.

Solvent:

The composition of the present invention comprises a solvent.

Non-limiting examples of such products include those containing purified water, organic solvents, and mixtures thereof.

The solvent is present in the composition of the present invention in an amount of from 0.1% to 99% by weight, based on the total weight of the composition.

Alcohol:

The composition of the present invention comprises at least one alcohol.

Non-limiting examples of such products include ethanol, methanol, and propanol.

One preferred embodiment of the present invention includes compositions which comprise at least one alcohol, most preferably an alcoholic mixture of isopropyl alcohol and polyvinyl alcohol. Another preferred embodiment may include an alcoholic mixture of SD-Alcohol 40-B and polyvinyl alcohol.

The at least one alcohol is present in the composition of the present invention in an amount of from 5% to 70% by weight. In a preferred embodiment, an alcoholic mixture would include an amount of SD-Alcohol 40-B from 10% to 40% by weight, and an amount of polyvinyl alcohol of 5% to 25% by weight, based on the total weight of the composition.

Emulsifying Surfactant:

The composition of the present invention includes an emulsifying surfactant.

Non-limiting examples of such products include sorbitan, sugar alkyl esters, and ethers.

One preferred embodiment of the present invention includes compositions which comprise an emulsifying surfactant, most preferably glycerin.

The emulsifying surfactant is present in the composition of the present invention in an amount of from 2% to 15% by weight, preferably in an amount from 5% to 10% by weight, based on the total weight of the composition.

Buffering Agent:

The composition of the present invention includes a buffering agent.

Non-limiting examples of such products include sodium and potassium phosphates, sodium and potassium citrates, mono-, di- and triethanolamines, and 2-amino-2-(hydroxymethyl)-1.

One preferred embodiment of the present invention includes compositions which comprise a buffering agents, most preferably propanediol.

The buffering agent is present in the composition of the present invention in an amount of from 0.1% to 25% by weight, preferably in an amount from 1% to 20% by weight, based on the total weight of the composition.

Binder:

The composition of the present invention includes a binder.

Non-limiting examples of such products include polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyvinylalcohol, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, carboxyl methyl cellulose, and a low-molecular-weight compound having a molecular weight of 10,000 g/mol or less.

One preferred embodiment of the present invention includes compositions which comprise a binder, most preferably a pullulan.

The binder is present in the composition of the present invention in an amount of from 0.5% to 15% by weight, preferably in an amount from 1% to 10% by weight, based on the total weight of the composition.

Gelling Agent:

The composition of the present invention includes a gelling agent.

Non-limiting examples of such products include carboxyethylene or polyacrylic acid such as Carbopol 980 or 940 NF, 981 or 941 NF, 1382 or 1342 NF, 5984 or 934 NF, ETD 2020, 2050, 934P NF, 971P NF, 974P NF, Noveon AA-1 USP; or cellulose derivatives such as ethylcellulose, hydroxypropylmethylcellulose (HPMC), ethylhydroxyethylcellulose (EHEC), carboxymethylcellulose (CMC), hydroxypropylcellulose (HPC) (Klucel different grades), hydroxyethylcellulose (HEC) (Natrosol grades), HPMCP 55, Methocel grades.

One preferred embodiment of the present invention includes compositions which comprise a gelling agent, most preferably a carbomer.

The gelling agent is present in the composition of the present invention in an amount of from 0.05% to 1.5% by weight, preferably in an amount from 0.1% to 1% by weight, based on the total weight of the composition.

Coloring Agent:

The composition of the present invention includes a coloring agent.

Non-limiting examples of such products include inorganic pigments, silicones, perfluorinated compounds, lecithin, and amino acids. Exemplary inorganic pigments may include include metal oxides, mixed metal oxides, antimony yellow, ultramarine blue, cobalt blue, manganese blue, chrome oxide green, hydrated chrome oxide green, cobalt green, metal sulfides, cadmium sulfoselenides, zinc ferrite, and bismuth vanadate.

One preferred embodiment of the present invention includes compositions which comprise a coloring agent, most preferably a substantially black color, green color, tan color, brown color, grey color, a whitening agent such as titanium dioxide, or any combination and shades thereof.

The coloring agent is present in the composition of the present invention in an amount of from 0.1% to 15% by weight, preferably in an amount from 1% to 10% by weight, based on the total weight of the composition.

Preservative:

The composition of the present invention includes at least one preservative.

Non-limiting examples of such products include benzalkonium chloride and derivatives, benzoic acid, benzyl alcohol and derivatives, bronopol, parabens, centrimide, chlorhexidine, cresol and derivatives, imidurea, phenol, phenylethyl alcohol, phenylmercuric salts, thimerosal, sorbic acid and derivatives.

One preferred embodiment of the present invention includes compositions which comprise at least one preservative, most preferably a phenoxyethanol, ethylhexylglycerin, or any combination thereof.

The preservatives are present in the composition of the present invention in an amount of from 0.05% to 1.5% by weight, preferably in an amount from 0.1% to 1% by weight, based on the total weight of the composition.

Although the above examples list a preferred selection of chemical ingredients in the composition, it is envisioned that a respective alternative ingredient in each category may be used for the composition. For example, the solvent is water, the alcohol is a combination of isopropylacohol, polyvinyl alcohol or any combination thereof, the emulsifying surfactant is sorbitan, the buffing agent is triethanolamines, the binder is polyacrylonitrile, the gelling agent is hydroxypropylmethylcellulose, the coloring agent is chrome oxide green, and the preservative is a combination of phenylethyl, centrimide or any combination thereof.

The solution may be provided in any color, though being camouflage, the solution may be provided in certain colors, such as grey, dark grey, black, green, light green, brown, light brown, and the like. In another example, for other uses, such as in winter conditions, the color may be white, light grey, and the like.

The composition of the solution may have a relatively fast drying time such that it may be simply applied so that it turns to a solid quickly for immediate use. For instance, once applied to the skin, the solution may turn to a solid in less than five minutes, in less than two minutes, or in less than a minute. By "solid," the solution is no longer a liquid, but instead adheres to the skin of a user (for example) and does not drip or come off on clothing. For example, a "solid" state of the solution maintains ample flexibility and malleability such that it can stretch and contract along with the underlying skin to which it was applied. Alternatively, the "solid" state could be more rigid, which could be beneficial in certain applications. In this "solid" state, the malleability of the solution may conform to the movement of the surface that the solution is applied on. For instance, if the solution solidifies on the skin of a user, the solution may be malleable enough to conform to the user's movements such that the user feels minimal (if any) tugging or pinching sensations when moving around with the solution. At the same time, this malleability enables the solution to be more easily removed from its applied surface by, for instance, peeling, scraping, or rolling (without the need for water, soap, or other solvents, such as baby wipes), as the solution's malleability allows for the solution to be removed in one whole piece, or a series of larger pieces, rather than individual fragments, flakes, or the like. The actual composition of the solution may differ depending on the desired properties to be obtained, such as the degree of malleability of the solution upon turning to a solid.

Turning to the applicator, the applicator allows for a more efficient means of applying a liquid product including, for instance, the above skin marking solution. Specifically, the tips of the applicator, as further described below, allows for ergonomic handling by a user in applying the skin marking solution.

Figure 1B:
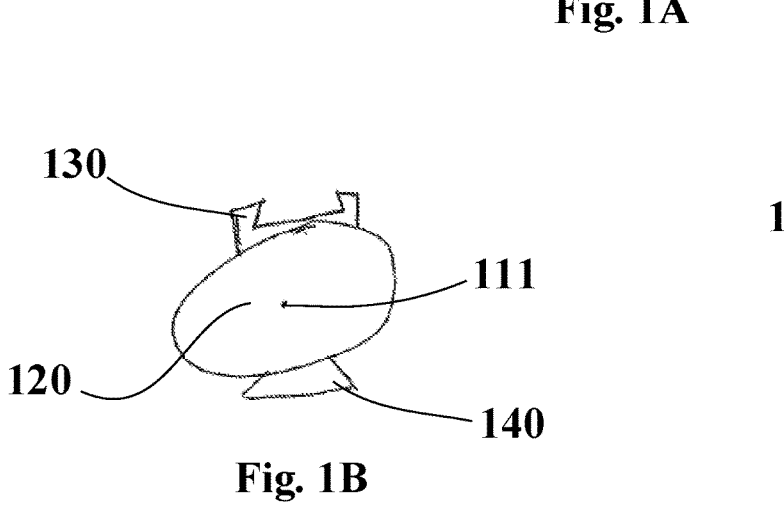
FIG. 1B depicts a top view of the applicator of FIG. 1A.
Figure 1C:
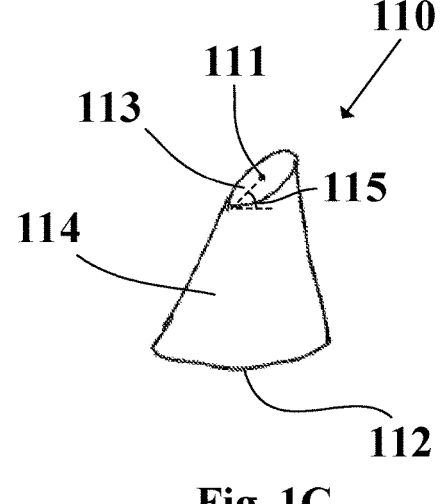
FIG. 1C depicts an isometric view of the tip of the applicator of FIG. 1A.

FIGS. 1A-C depicts an embodiment of an applicator. FIG. 1A depicts a side view of an applicator 100 comprising tip 110, housing 120, and connectors 130, 140.

FIG. 1B depicts a top view of applicator 100. In this embodiment, housing 120 is a compressible, cylindrical tube having connector 130 on one side and another connector 140 on the opposite side. Connector 130 is a female dovetail connection while connector 140 is a male dovetail connect. Connector 130 is sized to receive a male dovetail of approximately the same size and shape as connector 140, as depicted in FIGS. 7A-B, further described below. Although not shown, housing 120 is hollow to allow for the skin marking solution to be housed within. Housing 120 is constructed of a material that is compressible by hand or otherwise can be manipulated to expel the solution. For instance, housing 120 may be constructed of plastic, flexible metals, paper-based materials, foil, glass with an applicator stick or a plunger, or the like.

Although housing 120 is depicted as substantially cylindrical, it is envisioned that, in other embodiments, the housing is rectangular, triangular, or any other shape. In another embodiment, the connectors are not on opposite faces of the housing and may be located on any location of the housing. In yet another embodiment, there may be any number of connectors on the housing. In yet another embodiment, the connectors may all be male, female, or any combination thereof. In yet another embodiment, the connectors may run along the full length of the body. In yet another embodiment, one connector may be of a different length than the other connector on the body.

FIG. 1C depicts tip 110 having a base end 112, surface 114, face 113, and hole 111. Surface 114 tapers from a wider area at a base end 112 to a smaller area on face 113. Face 113 is positioned transverse from the cross-sectional area of tip 110 at base end 112 at an angle 115. Angle 115 allows a user to handle applicator 100 in a more comfortable gripping angle. For instance, it is more natural—and allows for a greater level of control—for a user to hold applicator 100 with the tips of their fingers (not shown), while resting a lengthwise portion of housing 120 on the connecting joint (not shown) of the thumb and forefinger. However, holding applicator 100 in this manner requires applicator 100 to be at an angle when in use. Angle 115 of face 111 appropriately accounts for such a manner of use, and allows for a more comfortable application of the skin marking solution. Angle 115 may be at any angle but is preferably between 35° to 55°.

Although surface 114 is depicted as being tapered, it is envisioned that, in other embodiments, the surface is not tapered or may, for instance, widen from a base end to a face. In another embodiment, the base end of the tip may have substantially the same area as the rest of the tip. In yet another embodiment, the taper from the base end to the face is non-linear and may be, for instance, curved, in step-wise fashion, or the like. Regardless, the angled tip of FIG. 1C provides for a surface (as here, a flat surface) capable of smearing the solution against the skin in contact with it. Such an applicator tip may provide for a more consistent layer of solution to be applied to the skin.

In another embodiment of the invention, FIG. 2 depicts applicator 200 having tip 210 with hole 211, as described above. In this embodiment, tip 210 is a substantially round shape. In this manner, the skin marking solution may similarly be smoothly applied while applicator 210, though the curved face may allow application with the tip at any angle relative to the skin.

In another embodiment of the invention, FIG. 3 depicts applicator 300, as described above. In this embodiment, tip 210 is a brush. In this manner, the skin marking solution may be applied evenly onto a surface. Additionally, after the skin marking solution has stopped being dispensed from applicator 300, the user may still use brush 310 to evenly spread the skin marking solution on the surface.

In another embodiment of the invention, FIG. 4 depicts applicator 400, as described above. In this embodiment, tip 410 is a felt material. In this manner, the skin marking solution may be applied evenly while maintaining a precise and consistent application area, and, similar to the brush, the felt tip may be used to subsequently spread the skin marking solution on the desired surface.

In another embodiment of the invention, FIG. 5 depicts applicator 500, as described above. In this embodiment, connectors 530, 540 are magnetic portions. One of connectors 530, 540 may be positive or negative. In this manner, another applicator may be more easily attached to applicator 500 without having to aim the connectors or slide one applicator adjacent another. It is envisioned that, in other embodiments, both portions may be positive or both portions may be negative.

In another embodiment of the invention, FIG. 6 depicts applicator 600, as described above. In this embodiment, connectors 630, 640 are tongue and groove shaped, with connector 630 being the tongue and connector 640 being the groove. In this manner, another applicator may be attached to applicator 600 without having to aim the connectors or slide the applicators, but rather, these connectors can simply be snapped into relative position. Further, connectors 630, 640 provide proper longitudinal alignment upon being connected.

In another embodiment of the invention, FIG. 7 depicts applicator 700, as described above. In this embodiment, connector 730 is a fabric portion and connector 740 is a Velcro portion.

While numerous tips and connectors have been disclosed above, the present invention is not so limited, but rather, the applicator may have any shape or size, the tip may be of any type, shape or size, and the connectors may also be of any type, shape or size. For instance, a tip with a unique shape may be used to assist the user in creating unique patterns and shapes on the applied surface.

Figure 8A:
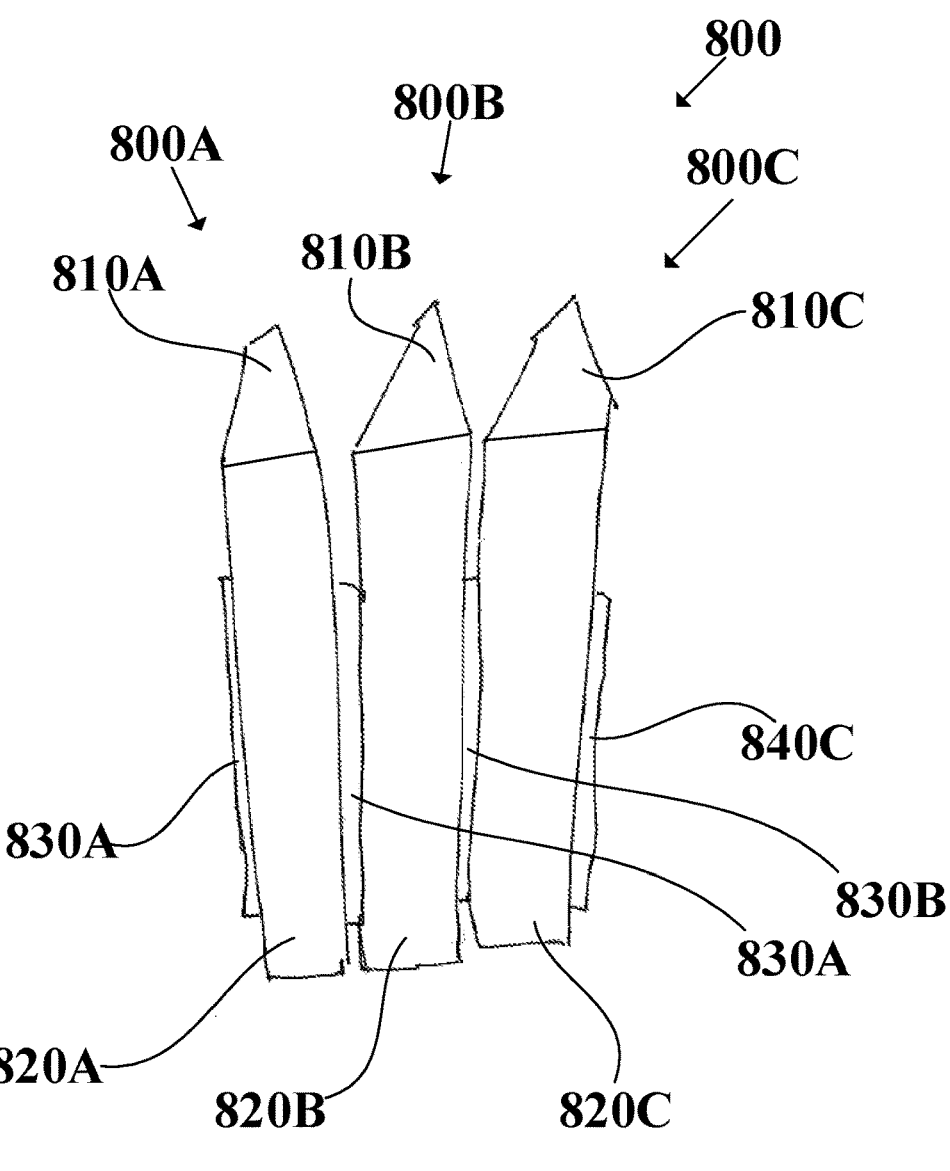
FIG. 8A depicts a side view of an applicator system according to another embodiment of the invention.
Figure 8B:
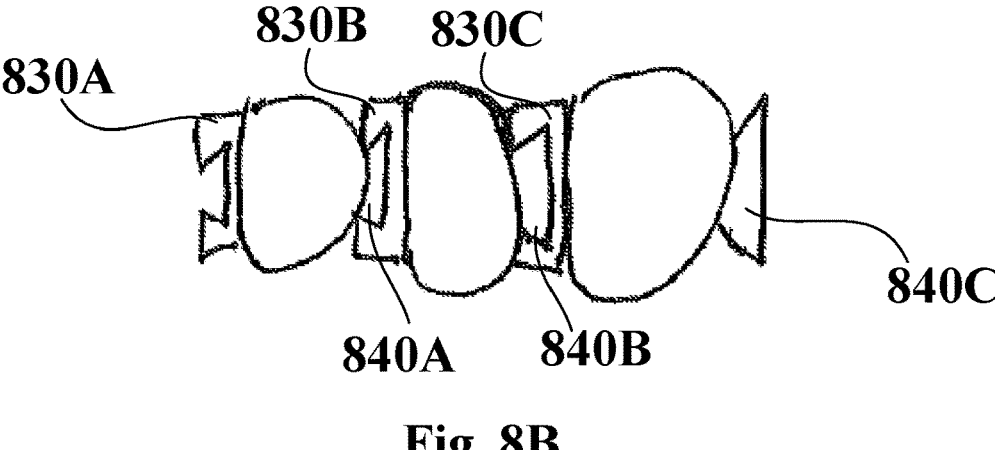
FIG. 8B depicts a top view of the applicator system of FIG. 8A.

In another embodiment of the invention, FIGS. 8A-B depicts an applicator system 800 having applicators 800A, 800B, 800C, as depicted above. In this embodiment, applicator 800A is attached to applicator 800B through connector 840A being received in connector 830B. Applicator 800B is attached to applicator 800C through connector 840B being received in connector 830C. In this manner, for example, multiple colors may be applied at a given time and/or a larger surface area may be camouflaged more efficiently.

In addition to that described above and illustrated in the figures, various other operations will now be described. It should be understood that the following operations do not have to be performed in the exact order described below. Instead, various steps may be handled in a different order or simultaneously. Steps may also be omitted or added unless otherwise stated therein.

In an embodiment of use, skin marking solution may be applied by gathering a globule of skin marking solution. The globule may be gathered by being dispensed from a tip of an applicator, another object, or gathered onto a hand or a finger of a user. In other embodiments, a plurality of applicators, attached by connectors, as described above in FIGS. 8A-B, may be used; each of the globules of a skin marking solution being gathered on the respective tips of each applicator. As discussed above, each applicator and skin marking solution may be the same color or a variety of colors, and may form a desired color or design pattern on the surface to which they are being supplied.

The globule is then pressed or smeared onto a surface (e.g. a part of a body, such as a face, other skin, article of clothing, or the like) and spread on the surface. Where a plurality of applicators are used, a user may spread the globules on the surface by mixing them. The user may spread the globule with the tip(s) of an applicator(s), their hand, or any other instrument.

It is envisioned that, in an alternative embodiment, a user may gather a globule of the skin marking solution onto their hand by dipping their hand or finger into a container of the skin marking solution, rather than with an applicator. The user may then take the globule and apply, spread or smear the globule on a surface with their hand or finger.

Once the globule has been sufficiently spread on the surface, the user may wait a period of time for the skin marking solution to change from a liquid state to a solid state. Alternatively or additionally, the skin marking solution may be blown on to expedite the change to a solid state. As discussed above, the solution may dry quickly such that it is ready for use soon after application.

After the skin marking solution has changed to a solid state, and when the user is ready to do so, the user may remove the solution from the surface. This may include scraping, rolling, or peeling. Although water, solvents, baby wipes, and the like, may be used, none are required. Instead, the solution of the present disclosure is designed to be easily peeled, rolled, or scraped from the surface to which it was applied without the need of any application of solvents, and without the need for any special instruments in part due to the solution's malleability while solidified. For instance, a sports player or fan may be able to more easily and quickly remove the skin marking solution by peeling the solution off after the end of a sporting event without the need for any added soap or solvents (e.g. by peeling the skin marking solution off the face of the user).

The aforementioned ability to apply and remove the skin marking solution of the present disclosure quickly, and without the need for water or other solvents, allows for ease and simplicity of use. For instance, on a multi-day out door event (e.g. hunting, military excursion, or the like) in a remote area, the skin marking solution, such as a camouflage solution, may be applied on a surface, such as the hunter's face, and removed daily, without the need of water, soap, or a chemical solvent, which would have to be carried into the remote area by the user. Continuing with the example of a hunter using the camouflage solution, as no water, soap, or solvent is required to remove the camouflage solution, the hunter may simply peel the camouflage solution off the hunter's face each day without any additional tools or assistance. Further, while in use, the camouflage solution may remain malleable, decreasing the irritability of the solidified solution while on the skin, such as any tugging or pinching sensations, which increases comfort during use, particularly, for example, where the solution is used as camouflage on a user's face for multiple days in a row. As such, the solution of the present disclosure provides for simplified application, comfort while applied to the surface of the user, and simplified removability. The composition of the solution of the present disclosure provides for each of these benefits, in that the solution quickly turns into a solid on the surface to which it was applied, and once in its solid form, remains malleable for ease of wearing and improved comfort, and allowing for the aforementioned rolling or peeling for removal. The malleability of the solution in its solid form limits any cracking or breaking of the solution during such rolling or peeling.

Additionally, the solution's easy removal allows for some room for error in its application. If the wrong combination of colors are applied, the solution may be easily removed after a brief period of time. In this manner, precious resources, such as a limited amount of carried drinking water, do not have to be wasted. Further, since the solution is non-toxic is allows for simple and safe disposal.

The following example further describes and demonstrates embodiments within the scope of the present invention. The example is given solely for the purpose of illustration and is not to be construed as limitations of the present invention, as many variations thereof are possible without departing from the spirit and scope of the invention. All exemplified amounts are concentrations by weight of the total composition, unless otherwise specified.

Example 1

The following skin marking solution composition, containing the ingredients as detailed hereunder, was prepared:

| CHEMICAL NAME | % by weight |
| --- | --- |
| Water | 38% |
| SD-Alcohol 40-B alcohol | 20% |
| Polyvinyl alcohol | 15% |
| Glycerin | 5% |
| Propanediol | 10% |
| Pullulan | 5% |
| Carbomer | 0.5% |
| Coloring agent | 5% |
| Phenoxyethanol | 0.5% |
| Ethyhexylglycerin | 1% |

The above compositions of Example 1 incorporate the various features of the solution, as mentioned above. For instance, the above exemplary compositions allow for the solution, in a liquid form, to be easily extruded from an applicator and smoothly applied on a surface. After application, the solution may rapidly dry, allowing for a decreased waiting period between application and use, and allowing for quick removal of the solution upon its application, if needed. Upon the solution drying and solidifying, the solution maintains a durable but malleable quality. The solidified solution is capable of lasting long periods of time such as, for instance, during a full day of hunting, while suffering minimal, if any, decreases in its structural or functional integrity. As an example, the solution may remain physically intact and without losing any of its color's vibrancy despite many hours of use in a rugged environment. Moreover, while the solution is in its solid form, it retains its malleability such that it conforms to the movement of the surface on which the solution is applied. For instance, where the solution is applied to a user's skin, the solution does not tug or pinch on the skin, thereby providing greater comfort for the user during vigorous movement. Further, removing the solution is a simple process that involves scraping, peeling, or rolling the solution off the surface. This may be done without the need for accompanying water or solvent (e.g. soap, baby wipes, etc.), and further, without the need for special instruments. The solution's malleable quality increases the ease of the solution's removal by allowing for the solution to be removed in one quick process, rather than removing fragments of a fractured solution, as in previous skin marking solutions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of applying a camouflage solution for outdoor use comprising:

gathering a globule of the camouflage solution;

pressing the globule of the camouflage solution onto a skin surface;

spreading the globule of the camouflage solution on the skin surface, wherein the camouflage solution changes from a liquid form to a solid form on the skin surface and adheres to the skin surface;

and removing the camouflage solution in solid form from the skin surface by rolling, scraping, and/or peeling, wherein the camouflage solution in solid form is suitable for removal from the skin surface without the use of water or a solvent;

the camouflage solution including an alcohol ranging from 20% to 70% by weight with respect to the weight of the liquid form of the camouflage solution, glycerin ranging from 5% to 10% by weight with respect to the weight of the liquid form of the camouflage solution, and propanediol ranging from 1% to 20% by weight with respect to the weight of the liquid form of the camouflage solution, wherein the alcohol includes 10% to 40% SD-Alcohol 40-B by weight with respect to the weight of the liquid form of the camouflage solution and 5% to 25% polyvinyl alcohol by weight with respect to the weight of the liquid form of the camouflage solution.

2. The method of claim 1, wherein the gathering step further comprises gathering the globule on an applicator, the pressing step further comprises pressing the globule with the applicator, and the spreading step further comprises spreading the globule with the applicator.

3. The method of claim 2, wherein the gathering step further comprises attaching the applicator to at least one other applicator, each of the applicators gathering a respective globule of camouflage solution on a respective tip of the applicators.

4. The method of claim 1, wherein the gathering step further comprises gathering the globule on a user's hand, the pressing step further comprises pressing the globule with the user's hand, and the spreading step further comprises spreading the globule with the user's hand.

5. The method of claim 1, wherein the outdoor use includes at least one of hunting, sports, recreational activities, or military use.

6. A method of applying a camouflage solution comprising:

gathering a globule of the camouflage solution onto an applicator, the camouflage solution including an alcohol ranging from 20% to 70% by weight with respect to the weight of the liquid form of the camouflage solution, glycerin ranging from 5% to 10% by weight with respect to the weight of the liquid form of the camouflage solution, and propanediol ranging from 1% to 20% by weight with respect to the weight of the liquid form of the camouflage solution;

pressing the globule of the camouflage solution onto a skin surface with the applicator;

spreading the globule of the camouflage on the skin surface, wherein the camouflage solution changes from a liquid form to a solid form on the skin surface and adheres to the skin surface;

and removing the camouflage solution in solid form from the skin surface by rolling, scraping, and/or peeling, wherein the camouflage solution in solid form is suitable for removal from the skin surface without the use of water or a solvent;

wherein the alcohol includes 10% to 40% SD-Alcohol 40-B by weight with respect to the weight of the liquid form of the camouflage solution and 5% to 25% polyvinyl alcohol by weight with respect to the weight of the liquid form of the camouflage solution.

7. The method of claim 6, wherein the gathering step further comprises attaching the applicator to at least one other applicator, each of the applicators gathering a respective globule of camouflage solution on a respective tip of the applicators.

8. The method of claim 6, wherein the spreading step further comprises spreading the globule with the applicator.

9. A method of using camouflage solution comprising:

gathering a globule of the camouflage solution onto an object;

pressing the globule of the camouflage solution onto a skin surface with the object;

spreading the globule of the camouflage on the skin surface, wherein the camouflage solution changes from a liquid form to a solid form on the skin surface and adheres to the skin surface;

and removing the camouflage solution from the surface by rolling, scraping, and/or peeling, wherein the camouflage solution in solid form is suitable for removal from the skin surface without the use of water or a solvent; the camouflage solution including an alcohol ranging from 20% to 70% by weight with respect to the weight of the liquid form of the camouflage solution, glycerin ranging from 5% to 10% by weight with respect to the weight of the liquid form of the camouflage solution, and propanediol ranging from 1% to 20% by weight with respect to the weight of the liquid form of the camouflage solution, wherein the alcohol includes 10% to 40% SD-Alcohol 40-B by weight with respect to the weight of the liquid form of the camouflage solution and 5% to 25% polyvinyl alcohol by weight with respect to the weight of the liquid form of the camouflage solution.

10. The method of claim 9, wherein the object is one of at least an applicator or a user's hand and wherein the gathering step further comprises at least one of gathering the globule on a tip of the applicator or a finger of the user's hand.

11. The method of claim 1, after waiting a period of time for the camouflage solution to change from a liquid state to a solid state, further comprising performing the outdoor use with the camouflage solution on the surface, wherein the outdoor use includes at least one of hunting, sports, recreational activities, or military use.

12. The method of claim 1, wherein the camouflage solution further comprises a binder in an amount from 0.5% to 15% by weight with respect to the weight of the liquid form of the camouflage solution, and wherein the binder is a pullulan.

13. The method of claim 1, wherein the camouflage solution does not comprise a sorbitan.

14. The method of claim 1, wherein the camouflage solution further comprises a gelling agent in an amount from 0.05% to 1.5% by weight with respect to the weight of the liquid form of the camouflage solution, wherein the gelling agent is a carbomer.

\* \* \* \* \*